(12) United States Patent
Vasan Suresh

(10) Patent No.: US 11,518,324 B2
(45) Date of Patent: Dec. 6, 2022

(54) CRASH STRUCTURE FOR A MOTOR VEHICLE, METHOD FOR PRODUCING A CRASH STRUCTURE OF THIS TYPE, AND MOTOR VEHICLE HAVING A CRASH STRUCTURE OF THIS TYPE

(71) Applicant: Next.e.GO Mobile SE, Aachen (DE)

(72) Inventor: Jayanthan Vasan Suresh, Aachen (DE)

(73) Assignee: Next.e.GO Mobile SE, Aachen (DE)

( * ) Notice: Subject to any disclaimer, the term of this patent is extended or adjusted under 35 U.S.C. 154(b) by 109 days.

(21) Appl. No.: 17/053,865

(22) PCT Filed: May 8, 2019

(86) PCT No.: PCT/EP2019/061881
§ 371 (c)(1),
(2) Date: Nov. 9, 2020

(87) PCT Pub. No.: WO2019/215267
PCT Pub. Date: Nov. 14, 2019

(65) Prior Publication Data
US 2021/0229611 A1    Jul. 29, 2021

(30) Foreign Application Priority Data
May 9, 2018  (DE) .......................... 102018111226.2

(51) Int. Cl.
*B60J 7/00*       (2006.01)
*B60R 19/18*      (2006.01)

(52) U.S. Cl.
CPC ........ *B60R 19/18* (2013.01); *B60R 2019/186* (2013.01); *B60R 2019/1893* (2013.01)

(58) Field of Classification Search
CPC ..... B60R 19/34; B60R 21/0136; B60R 19/18; B62D 21/152; B62D 1/195; B60N 2/42709
See application file for complete search history.

(56) References Cited

U.S. PATENT DOCUMENTS

| | | | | |
|---|---|---|---|---|
| 4,822,011 | A * | 4/1989 | Goldbach | B60R 19/26 267/140 |
| 6,406,081 | B1 * | 6/2002 | Mahfet | B60R 19/18 293/109 |
| 7,097,222 | B2 * | 8/2006 | Ran | B60R 19/28 293/137 |

(Continued)

FOREIGN PATENT DOCUMENTS

DE    19814842    10/1999

*Primary Examiner* — Kiran B Patel
(74) *Attorney, Agent, or Firm* — Fitch, Even, Tabin & Flannery, LLP

(57) ABSTRACT

The invention relates to a crash structure for a motor vehicle, comprising a carrier body, from the carrier surface of which at least one deformation unit formed integrally with the carrier body protrudes, which deformation unit is formed by at least two deformation elements arranged one over the other and connected to each other and by an impact surface, wherein: a longitudinal section of each deformation element has two longitudinal section surfaces lying opposite each other and following respective non-straight curves; the impact surface is spaced apart from the carrier surface by the deformation elements.

12 Claims, 6 Drawing Sheets

(56) References Cited

U.S. PATENT DOCUMENTS

Figure 1:
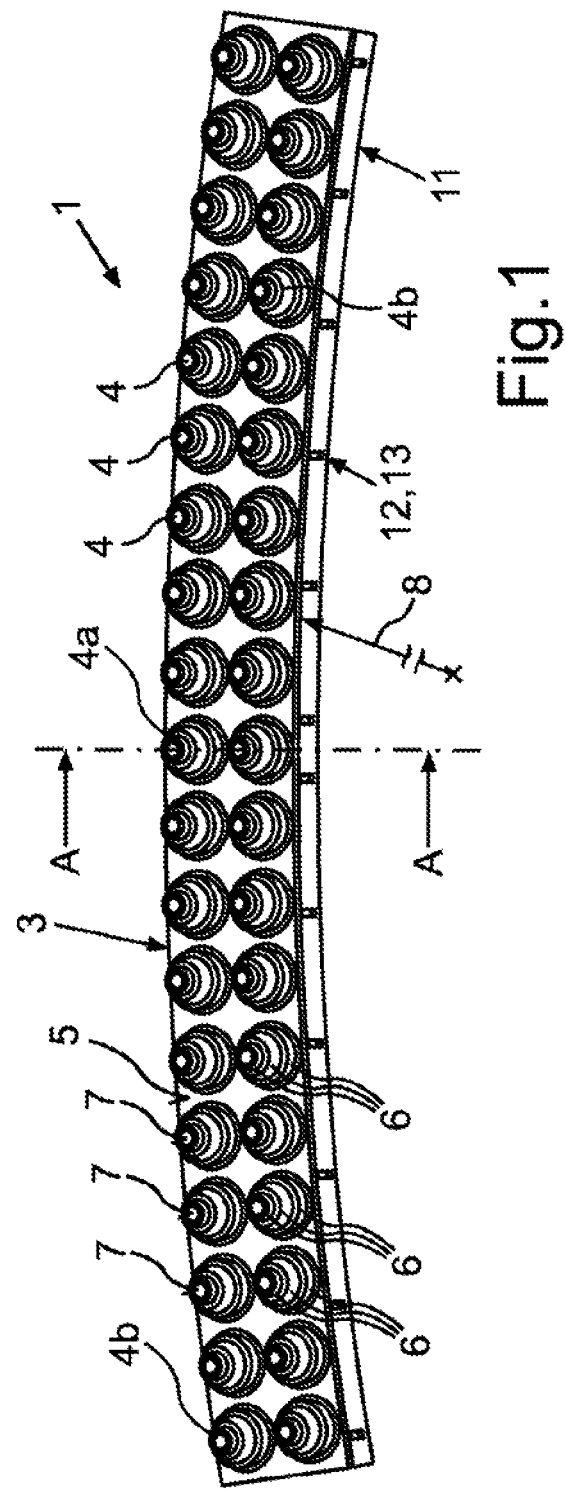

| | | | | |
|---|---|---|---|---|
| 8,762,008 B2* | 6/2014 | Marchthaler | ........... | F16F 7/125 296/187.03 |
| 8,985,652 B1* | 3/2015 | Switkes | ................. | B60R 19/20 293/136 |
| 2002/0149214 A1* | 10/2002 | Evans | .................... | B60R 19/18 293/133 |
| 2002/0185795 A1 | 12/2002 | Le | | |
| 2003/0189343 A1* | 10/2003 | Evans | .................... | B60R 19/18 293/120 |
| 2004/0256867 A1 | 12/2004 | Evans et al. | | |
| 2005/0057053 A1 | 3/2005 | Evans et al. | | |
| 2007/0228746 A1* | 10/2007 | Cormier | .................. | B60R 19/18 293/102 |
| 2010/0109353 A1* | 5/2010 | Allen | ...................... | B60R 19/18 293/120 |
| 2012/0032458 A1* | 2/2012 | Brooks | .................. | B29C 51/10 29/446 |
| 2013/0113226 A1* | 5/2013 | Bobba | ..................... | B60R 19/18 293/133 |
| 2013/0300139 A1* | 11/2013 | Fukawatase | ............ | B60R 19/36 293/133 |

* cited by examiner

CRASH STRUCTURE FOR A MOTOR VEHICLE, METHOD FOR PRODUCING A CRASH STRUCTURE OF THIS TYPE, AND MOTOR VEHICLE HAVING A CRASH STRUCTURE OF THIS TYPE

CROSS-REFERENCE TO RELATED APPLICATIONS

This application is a § 371 national stage entry of International Application No. PCT/EP2019/061881, filed May 8, 2019, which claims priority to German Patent Application No. 102018111226.2, filed May 9, 2018, the entire contents of which are incorporated herein by reference.

The invention relates to a crash structure for a motor vehicle, a method for manufacturing such a crash structure and a motor vehicle comprising such a crash structure.

If a motor vehicle, in particular a passenger vehicle, is involved in a traffic accident, in particular with a poorly protected or unprotected road user, for example a pedestrian, conventional crash structures nowadays serve to convert an impact energy between the motor vehicle and the other party involved in the accident into deformation energy by deforming the crash structure. In this way, a relative speed between the motor vehicle and the other party involved in the accident should be reduced particularly gently, in particular without jolting, so that any injury to the other party involved in the accident and/or damage to the motor vehicle are particularly mild.

The problem addressed by the present invention is that of converting an impact energy between a motor vehicle involved in an accident and another party involved in the accident into a deformation energy, in a particularly advantageous manner, by means of a crash structure which is particularly easy to manufacture.

This problem is solved according to the invention by a motor vehicle crash structure with the features of claim 1. Further, this problem is solved by a motor vehicle comprising such a crash structure according to claim 11. In addition, this problem is solved according to claim 13 by a method for manufacturing such a crash structure. Advantageous embodiments and useful further developments of the invention are disclosed in the other claims. Advantages and advantageous embodiments of the crash structure according to the invention are to be regarded as advantages and advantageous embodiments of the motor vehicle according to the invention and vice versa.

According to the invention, a crash structure for a motor vehicle is provided with a carrier body, from the carrier surface of which at least one deformation unit formed integrally with the carrier body protrudes. The deformation unit is formed by at least two deformation elements arranged one above the other and connected to one another, and by an impact surface. Here, a longitudinal section of each deformation element has two longitudinal section surfaces lying opposite each other and following respective non-straight curves. The impact surface is spaced apart from the carrier surface by the deformation elements.

The carrier body, which can be formed at least partially from a thermoplastic, can have an at least substantially cuboid shape. One of the surfaces of the carrier body forms the carrier surface from which the at least one deformation unit extends away from the carrier body. Because the at least one deformation unit is formed in one piece with the carrier body, a respective surface of the deformation unit and the carrier surface merge seamlessly into one another The at least two deformation elements that are connected together, in particular three deformation elements that are connected together, form the deformation unit, in which the deformation elements extend from the carrier surface away from the carrier body. In this case, the impact surface merges seamlessly into an outer peripheral surface of the deformation element directly adjacent to the impact surface, wherein a seamless connection is also produced between the individual deformation elements, because the impact surface and the deformation elements are formed in one piece with one another.

When considering a sectional view of the crash structure, in particular with a longitudinal section of the respective deformation element, corresponding longitudinal section surfaces follow a respective curve that is not a straight line. In other words, the individual deformation elements each have a shape different from an annular cylinder. In particular, a respective curvature of the two longitudinal section surfaces points outwards, i.e. away from an interior of the corresponding deformation element. This means that an inner peripheral surface of the respective deformation element describes a concave profile along an inner peripheral direction of the corresponding deformation element.

By means of this crash structure, in particular due to the respective non-straight designed longitudinal section surfaces, in a particularly advantageous manner, a particularly high impact energy between the motor vehicle and another party involved in the accident can be absorbed and/or converted into a deformation energy. This is advantageous in that a relative speed between the motor vehicle involved in the accident and the other party involved in the accident is produced in a particularly gentle manner, so that the other party involved in the accident, in particular a poorly protected or unprotected road user, for example a pedestrian, a cyclist, etc., is only particularly lightly injured, and ideally not at all. Here, the crash structure is able to absorb a particularly high level of impact energy in a controlled manner or to convert it into deformation energy, before the crash structure or the at least one deformation unit has completely collapsed.

Accordingly, a particularly efficiently acting crash structure is achieved, by means of which a concept of a particularly effective pedestrian protection is take into account in a special way.

This very special, double-curved geometry of the deformation element has a significant influence on the ability to absorb forces, in particular forces arising during an accident. This means that a material type has a particularly low influence on this ability (force absorption). As a result, the crash structure can be manufactured from a lighter material, for example plastic such as PP (polypropylene) etc., instead of a particularly heavy material, for example metal. Nevertheless, the crash structure manufactured from plastic is then able to absorb a force similar to that of a crash structure manufactured from metal having the same geometry.

This additionally results in a particularly simple or low-cost manufacture of the crash structure. This is because thermoplastic can be formed in a more energy efficient manner than a metal which requires higher forming forces and/or more expensive forming processes compared with plastic. As a result, a lighter crash structure can be provided that has substantially equal high-performance and is more cost effective to manufacture.

In addition, PP has better elasticity properties when compared to ABS (acrylonitrile-butadiene-styrene), so that a risk that the crash structure will be permanently damaged due to a minor pedestrian impact on the crash structure is less than if the crash structure was manufactured from ABS. Accordingly, there is no need to replace the crash structure after such an accident, so that repair costs are particularly low.

Compared with conventional crash structures, the crash structure according to the invention also exhibits an advantageous behaviour in a predetermined, for example standardised, crash test, with low impact speed against a rigid target ("low-speed crash test"). Conventional crash structures designed for pedestrian protection are able to absorb only approximately 4% to 6% of the impact energy arising during such a crash test. Therefore, currently, in order to ensure a sufficient occupant protection or a sufficient vehicle stability, particularly massive, i.e. heavy crash boxes must be provided in the conventional vehicle support structure (for example a space frame). Thus, a harmful damage of the motor vehicle is counteracted.

By contrast, the crash structure according to the invention reduces the impact energy in such a low speed impact by up to 48%, in particular due to the above-described features, and, as a result of which, protects other in particular more difficult to repair and/or expensive components of the motor vehicle that is equipped with the crash structure according to the invention. In an assessment of the motor vehicle by an insurer, for example to establish which insurance class the motor vehicle is to be classified in, the crash structure leads to a classification that is particularly advantageous, in other words favourable for a user of the motor vehicle.

In particular, the respective non-straight curve that the respective longitudinal section surface follows can be a branch of a hyperbola. It is to be understood that one of the two longitudinal section surfaces can follow a first hyperbola branch of a first hyperbola, while the other of the two longitudinal section surfaces can follow a hyperbola branch of another hyperbola. It is however also possible that the respective hyperbola branch of the two longitudinal section surfaces belongs to a same hyperbola. In any case the two hyperbola branches are arranged with respect to one another in such a way that, as already described, the inner peripheral surface of the corresponding deformation element is designed concave along the inner peripheral direction. In other words, the inner peripheral surface, and consequently an outer peripheral surface connected to the inner peripheral surface via a material of the respective deformation element, curve outwardly away from a material-free interior of the prospective deformation element. This means that the inner peripheral surface and the outer peripheral surface together form an outwardly curved wall of the respective deformation element. Here, the outwardly curved wall at least partially forms a hyperbolic paraboloid.

Due to this very special geometry of the deformation elements or of the deformation unit, a particularly high impact energy can be converted into a deformation work by means of the crash structure, so that the relative speed between the motor vehicle involved in the accident and the other party involved in the accident can be even more gently reduced.

In a further embodiment of the crash structure, a cross-section of the respective deformation element has a cross-sectional surface following an oval. In particular, the oval can be designed as a symmetric oval or a non-symmetric or asymmetric oval. In addition, the oval can be designed as an ellipse, in particular as a circle. This means that the inner peripheral surface of the corresponding deformation element can follow the oval or the ellipse, in particular the circle, along its inner peripheral direction. Analogously, the outer peripheral direction of the corresponding deformation element can follow this oval, wherein the outer peripheral surface of the corresponding deformation is element spaced apart from the oval by a constant or inconstant distance. It is however also conceivable that the outer peripheral direction of the corresponding deformation element follows another oval. Correspondingly, an outer shape of the deformation element can follow an ovoid.

This geometric manifestation of the at least one deformation unit or of the deformation elements leads to an even higher efficiency of the deformation of the crash structure in the event of or during an impact of the other party involved in the accident on the crash structure or on the motor vehicle.

In order to be able to produce a graduated response behaviour of the crash structure to different levels of impact energies, the two deformation elements can enclose a larger area in a respective proximal region arranged close to of the carrier surface, along a respective inner peripheral direction, than in a respective distal region arranged remote from the carrier surface. In this way it is possible, for example, that in the case of a particularly low impact energy only the deformation element of deformation unit that is furthest away from the carrier surface absorbs the impact energy and converts the impact energy into deformation energy by performing the deformation work. In the case of a particularly high impact energy, a further deformation element arranged closer to the carrier surface can absorb the particularly high impact energy, in addition to or instead of the deformation element arranged furthest away from the carrier surface. In other words, the crash structure adapts to the level of the impact energy that arises.

A respective proximal region of the respective deformation element, i.e. a region arranged close to the carrier surface, can form a connection region or can be formed in the connection region. Via the connection region, the respective deformation element is connected, in particular directly, to the carrier surface or, in particular, directly to a further deformation element. If the deformation element in question does not directly adjoin the carrier surface, then this deformation element is connected via its connection region or via its proximal region to a distal region, i.e. a region arranged remote from the carrier surface, of a deformation element directly neighbouring the deformation element question. A distal region of the deformation element furthest away from the carrier surface can comprise the impact surface or can merge into or form same.

Because the surface enclosed by the proximal region is greater than the surface enclosed by the distal region, the deformation element can taper, starting from the carrier surface, in the direction towards the impact surface, forming a convex, concave and/or straight outer peripheral surface. However, it is particularly preferred if the deformation element starting from its proximal region widens once, in particular only once, to a maximum with a concave profile of the outer peripheral surface, and then opens into the distal region. Put more simply, the outer peripheral surface of the corresponding deformation element can virtually follow an egg shape.

In addition, a connection element can be provided in the crash structure arranged between the two deformation elements, by which the two deformation elements are connected to one another. Accordingly, a cross-sectional surface of the connection element follows an oval, which is at least congruent with the oval of the respective deformation element. Viewed in the longitudinal section, the respective connection element can have two opposing longitudinal section surfaces following a respective non-straight curve. It is however also conceivable that the two longitudinal section surfaces of the respective connection element follow a straight line.

Through an arrangement of the connection element between two neighbouring deformation elements, these can be deformed in a defined manner in the event of or during the impact, for example the connection element can be pushed into the deformation element arranged closer to the carrier surface, so that due to a deformation of the deformation unit, the deformation element further away from the carrier surface engages in the deformation element arranged closer to the carrier surface. This effectively prevents, during deforming of the deformation unit or of the deformation elements, the deformation from taking place at least substantially along a main deformation direction, and a lateral deflection of the deformation elements or of the deformation unit is prevented. Here, it is particularly advantageous if the main deformation direction in the installed position of the crash structure runs at least parallel to a vehicle longitudinal axis and/or at least substantially coincides therewith.

In this context, it can be provided that an outer contour of the connection element is designed at least substantially as a truncated cone, the outer surface of which forms a predetermined angle different from 90 degrees with a vertical arranged outside of the respective connection element, for example a parallel to the carrier surface. A force acting on the distal deformation element is then divided into a horizontal and a vertical force component in accordance with the laws of physics due to the angled outer contour of the connection element. As a result, more force can be absorbed by means of the deformation element.

For maximum force absorption, the angle has a value of 120 degrees, so that the outer surface encloses an angle of 60 degrees. In particular because of a construction space restriction, this angle can have a value from 90 degrees to 180 degrees, preferably from 130 degrees to 179 degrees, most preferably from 170 degrees to 178 degrees, ideally 177 degrees. Accordingly, the outer peripheral surface together with a vertical or parallel to the carrier surface arranged in the interior of the deformation element, correspondingly additionally encloses an angle of ideally 3 degrees. This very specific design of the angle between the vertical/verticals and the outer surface of the connection element produces an ideal balance between the shape stability of the deformation unit and the deformability thereof In other words, the deformation unit or the crash structure with the angle designed in this way is not too hard, in order to reduce the relative speed between the other party involved in the accident and the crash structure in a particularly gentle manner. Similarly, the crash structure the deformation unit is not too soft, in order not to be deformed too quickly or to fully collapse too quickly, which runs counter to the particularly gentle reduction of the relative speed.

In order to further support the particularly gentle reduction in the relative speed between the other party involved in the accident and the motor vehicle or the crash structure, it is particularly preferred if the crash structure contacts the largest possible area on a shape of the other party involved in the accident, for example a lower leg, thigh etc., before the process of reducing the relative speed begins. For this purpose, the impact surface and the carrier surface can be arranged at an angle to one another. Then, on the one hand, the crash structure can be incorporated in the motor vehicle in a particularly efficient manner and, on the other hand, a maximum protective effect can be ensured for the poorly protected or unprotected road user.

Alternatively, the impact surface and the carrier surface can be arranged parallel to one another. In particular, when the crash structure is used in a region of the motor vehicle where experience has shown that the other party involved in the accident can be expected to hit almost perpendicularly, this ensures a maximum protective effect for the other party involved in the accident, in particular the poorly protected or unprotected road user.

In order to secure a particularly large area region of the motor vehicle for the other party involved in the accident by means of the crash structure, the crash structure can have at least one further deformation unit, wherein the first and the further deformation unit are arranged one above the other and/or next to one another along the carrier surface. For example, a plurality of deformation units can be distributed irregularly along the carrier surface. It is particularly preferred if the plurality of deformation units is spaced apart from one another by a regular distance. In particular, a row-type arrangement and an at least substantially symmetric design of the crash structure have proven advantageous. In this way, the impact energy between the motor vehicle and the other party involved in the accident can be divided over a plurality of deformation units, so that the impact energy can be converted into deformation energy over a particularly large area and particularly efficiently by means of the crash structure while performing deformation work.

In addition, the carrier body of the crash structure can also have at least one lateral tab, by means of which the crash structure can be incorporated in the motor vehicle. In particular, the carrier body and the at least one lateral tab can be formed in one piece with one another. It is however also conceivable that the at least one lateral tab and the carrier body are connected together in a force-fitted, form-fitted and/or bonded manner. It is particularly preferred if the carrier body has a lateral tab along each of two parallel edges, so that the crash structure can be incorporated in the motor vehicle in a particularly positionally secure manner. For this purpose, the lateral tab or the lateral tabs can have a fastening device, which comprises for example at least one through-opening that completely penetrates the respective lateral tab, in order to connect the crash structure via the lateral tab or lateral tabs through the through-opening to a support structure, or to screw another component of the motor vehicle. The lateral tab can extend from the carrier body in the same direction as the individual deformation elements. Alternatively, the lateral tab can extend in a direction opposite to the individual deformation elements. If more than one lateral tab is used, the individual lateral tabs can protrude from the carrier body in opposite directions.

The invention further relates to a motor vehicle comprising the above-described crash structure, by means of which the impact energy can be converted, at least in large part, into deformation energy by the deforming of at least one of the two deformation elements.

By means of the motor vehicle equipped with the crash structure according to the invention, the impact energy between the other party involved in the accident and the motor vehicle involved in a traffic accident can be converted into deformation energy in a particularly advantageous manner by means of the above-described crash structure performing the deformation work.

It has been found to be particularly advantageous if a bumper of the motor vehicle is at least partially formed by the crash structure. Such a bumper is usually arranged in the region of the motor vehicle which will be struck by poorly protected or unprotected road users with a particularly high probability in an accident, in particular by their head, torso and/or extremities. Accordingly, it can be provided that a front and/or rear bumper, which are each also commonly referred to as a fender, comprise the crash structure or is/are at least partially formed by the crash structure. The crash structure can equally be applied to side bumpers of the motor vehicle, so that a frontal impact of the other party involved in the accident on a side of the motor vehicle, for example a door thereof, can be cushioned by means of the crash structure. In particular, with regard to a pedestrian as the other party involved in the accident, the crash structure can alternatively or in addition be incorporated in a roof, a car bonnet or a boot lid and/or any other flap of the motor vehicle, in order to absorb the impact energy between the pedestrian and the motor vehicle in a particularly efficient manner.

The invention further relates to a method for manufacturing the above-described crash structure. Here, in a first step, the carrier body having a flat portion is provided. In a further, for example second, step of the method, at least the flat portion of the carrier body is heated by means of a heating device of a forming tool. In particular, it can be provided that the entire carrier body is heated by means of the heating device. In this case, the carrier body, which, as described above, can be manufactured at least partially from a thermoplastic, is heated to a deformation temperature so that the thus heated carrier body can be deformed particularly easily.

In a further, for example third, step of the method, a negative pressure is generated between the flat portion of the carrier body and a negative mould of the at least one deformation unit by means of a vacuum device of the forming tool. In this case, the negative mould is a component of the forming tool. By means of the negative pressure generated in the negative mould, a material, in particular thermoplastic, of the flat portion comes into contact with an inner contour of the negative mould and, as a result of this the at least one deformation unit is formed on the carrier body.

In this way, the crash structure can be manufactured in a particularly simple and low-cost manner. In particular, the crash structure can be manufactured in a particularly material efficient manner, because machining such as drilling, turning, milling, etc., in particular is completely eliminated. In particular, a particularly complex use of joining methods is also avoided since, by means of this method, the carrier body and the at least one deformation unit are formed in one piece with one another Although a geometry of the at least one deformation unit is relatively complex, for example in comparison with a pure circular-cylindrical deformation unit, the crash structure can be manufactured particularly quickly and with low tolerance by means of this method.

After cooling of the carrier body, so that it has a temperature substantially below the deformation temperature, the crash structure produced by means of the method is at least substantially rigid and consequently can be easily handled, so that the produced crash structure can be removed from the forming tool and can subsequently be incorporated in the motor vehicle.

The undeformed carrier body can be unwound from a roll and fed to the forming tool. In other words, the flat carrier body can be fed to the forming tool during unwinding from the roll. However, it is also possible that the carrier body is provided as sheet goods or stacked goods and fed to the forming tool.

In any case, the carrier body can be cut to length before and/or after the forming of the at least one deformation unit, in order to give the crash structure a desired shape and/or desired dimensions.

Furthermore, the at least one lateral tab can be formed on the carrier body in a manner analogous to that by which the at least one deformation unit is formed. In particular, the forming tool can have a corresponding negative mould or a suction region, into which, or in or on which, one or more material portions of the carrier body are sucked in or on by generating the negative pressure, whereby the at least one lateral tab, is formed in particular in a common operation with the at least one deformation unit Further advantages, features and details of the invention are revealed by the following description of preferred exemplary embodiments and with reference to the drawings. The features and combinations of features mentioned in the description above as well as the features and combinations of features mentioned below in the description of the figures can be used not only on their own but also in combination with one another without departing from the scope of the invention.

Figure 2:
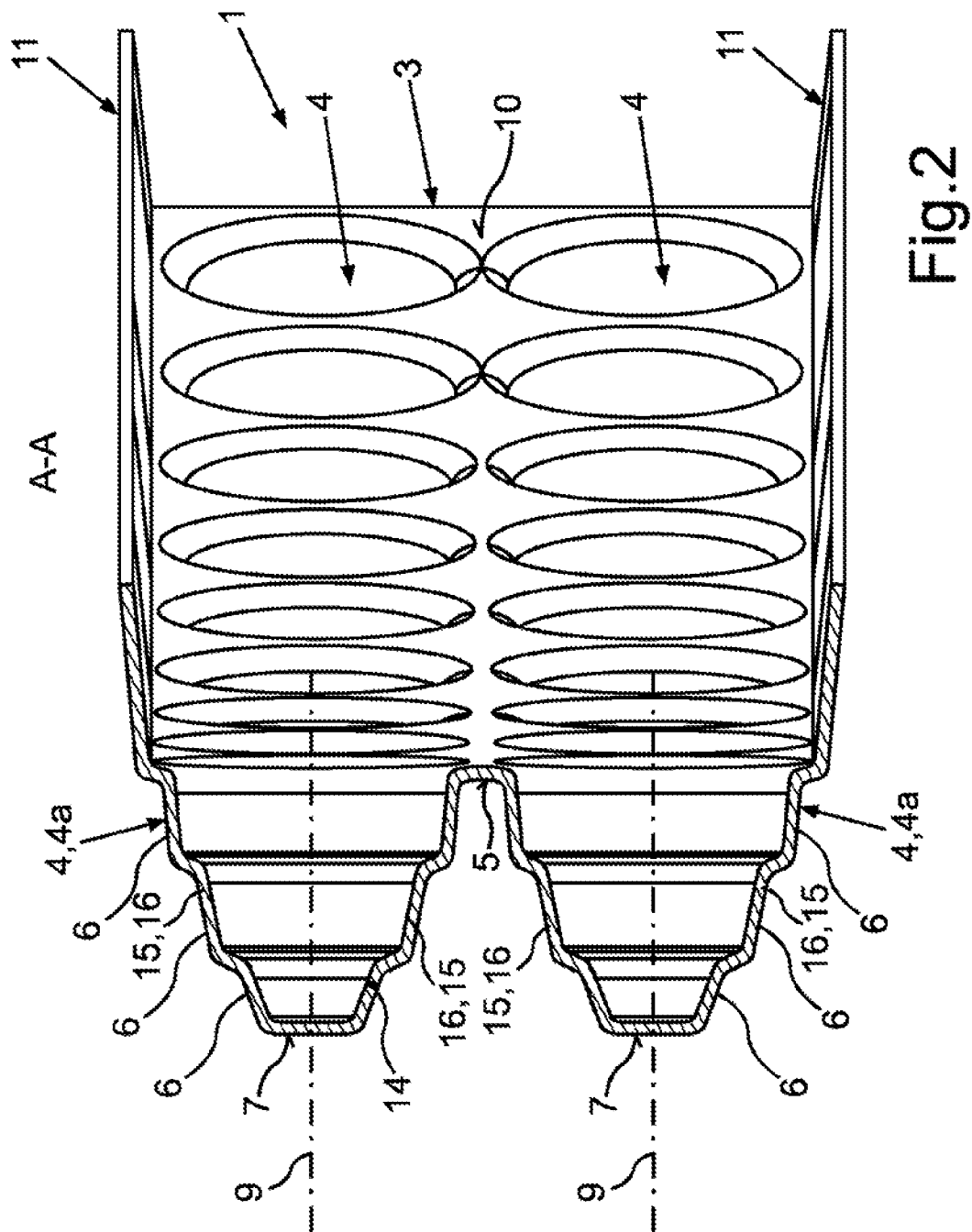
Figure 3:
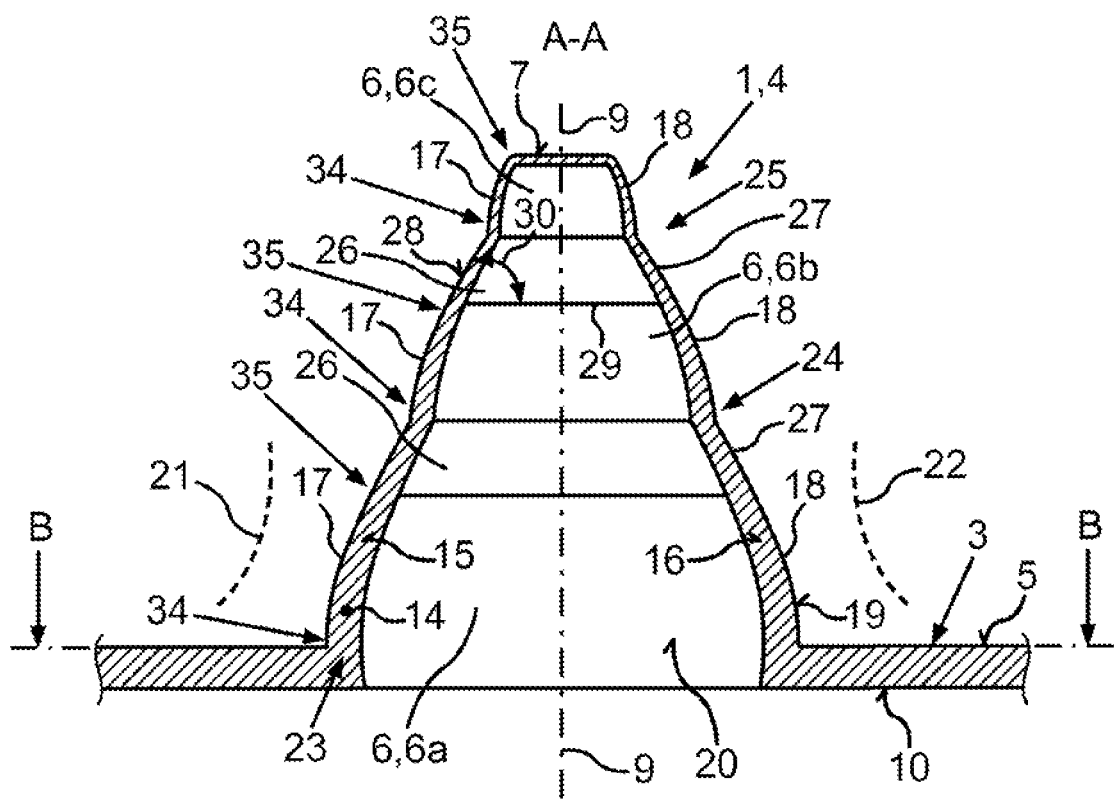
Figure 4:
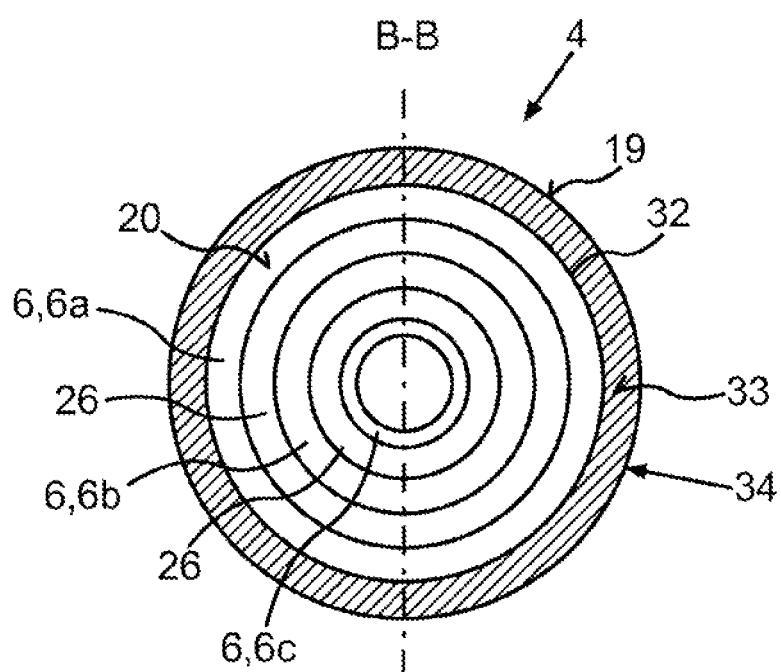
Figure 5:
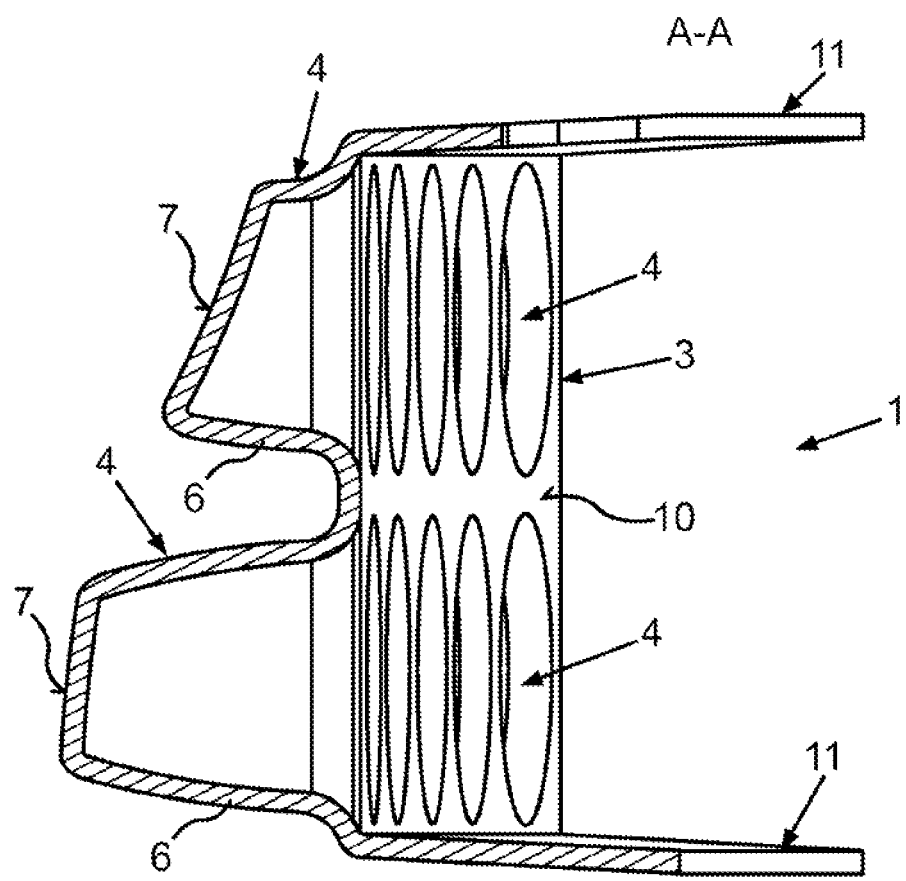
Figure 6:
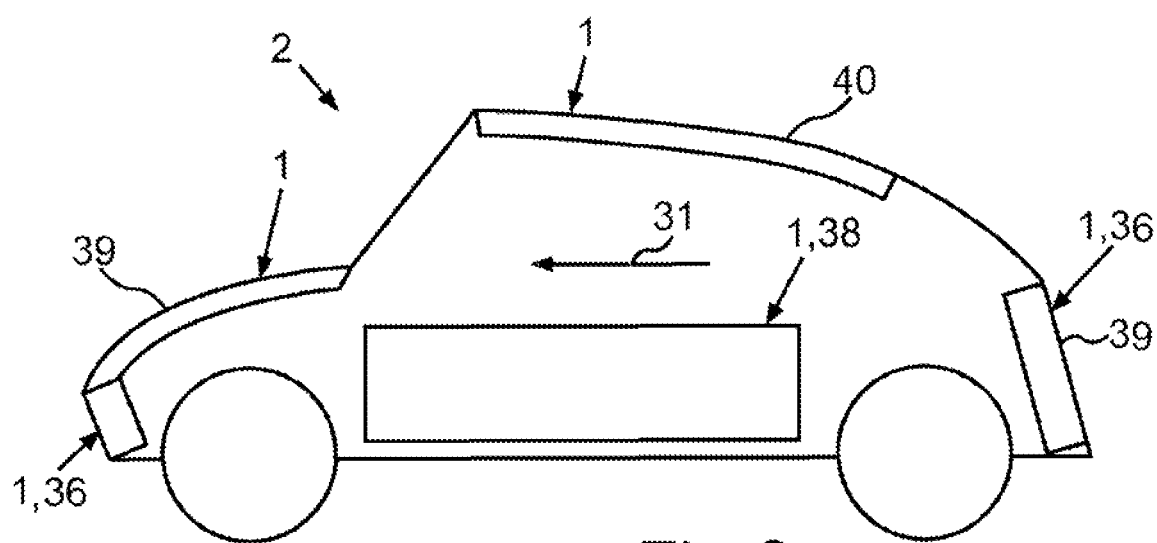
Figure 7:
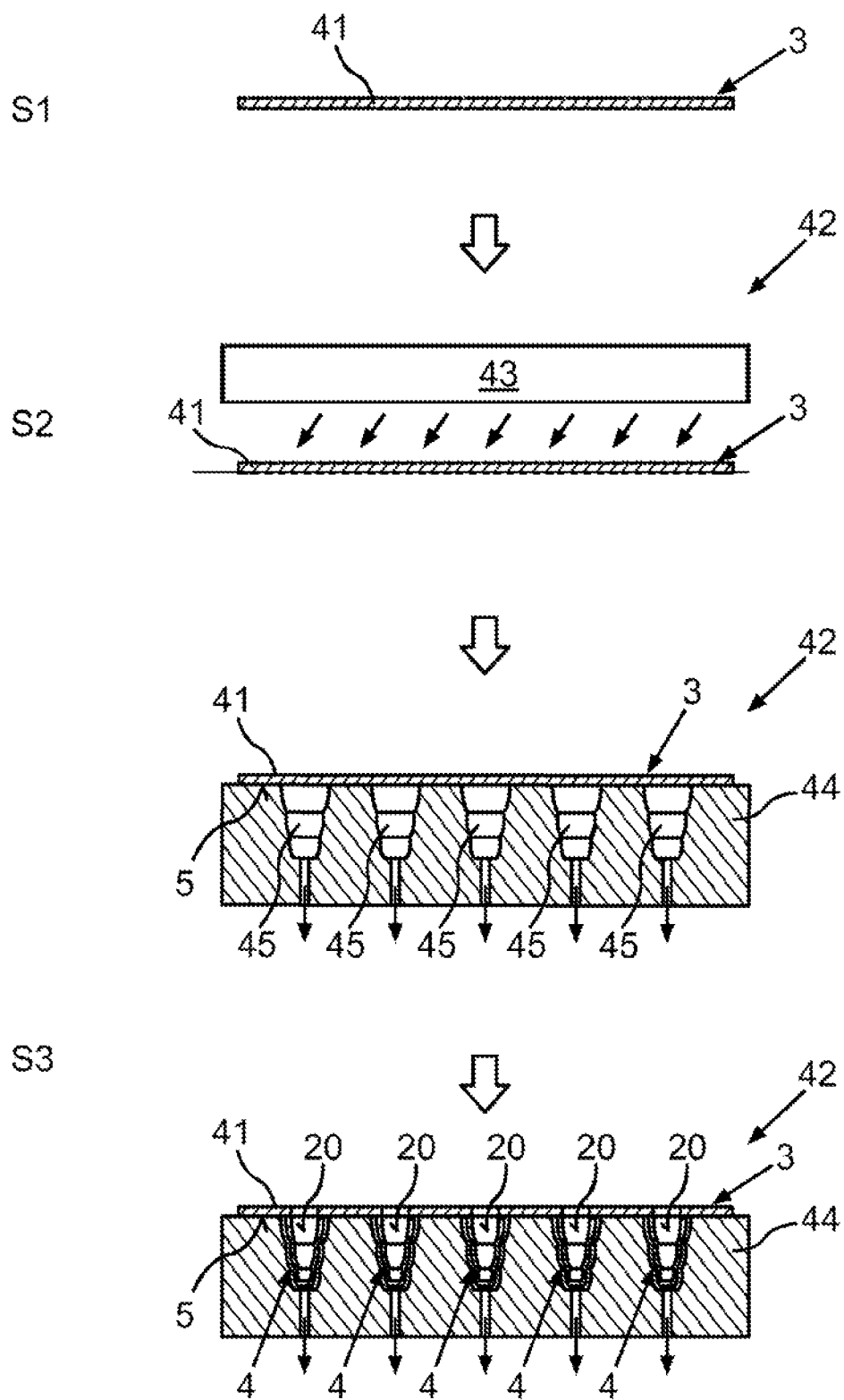
Figure 8:
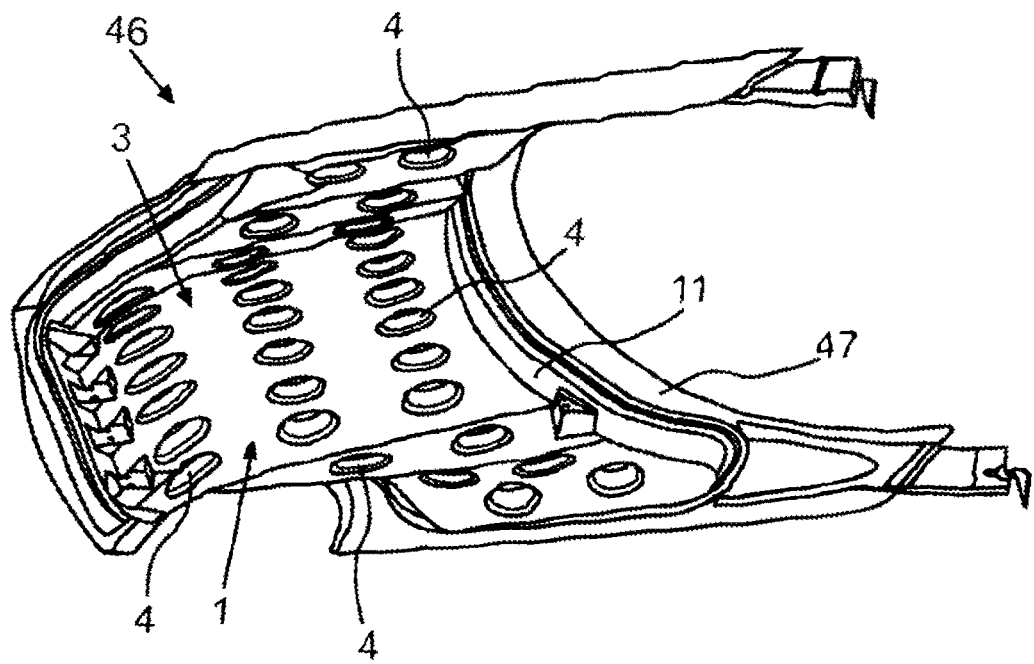

The drawing shows, in:

FIG. 1 a perspective view of a crash structure:

FIG. 2 a perspective view of the crash structure cut along a sectional plane shown in FIG. 1;

FIG. 3 a longitudinal sectional view of a deformation unit along the sectional plane shown in FIG. 1;

FIG. 4 a partial view of the crash structure, cut along a sectional plane shown in FIG. 3, with a view of the interior of the deformation unit;

FIG. 5 a perspective view of the crash structure according to a further embodiment, cut along the sectional plane shown in FIG. 1;

FIG. 6 a schematic illustration of a motor vehicle comprising the crash structure;

FIG. 7 a schematic sequence of method for manufacturing the crash structure;

FIG. 8 a perspective illustration of a flap of a motor vehicle; and

Figure 9:
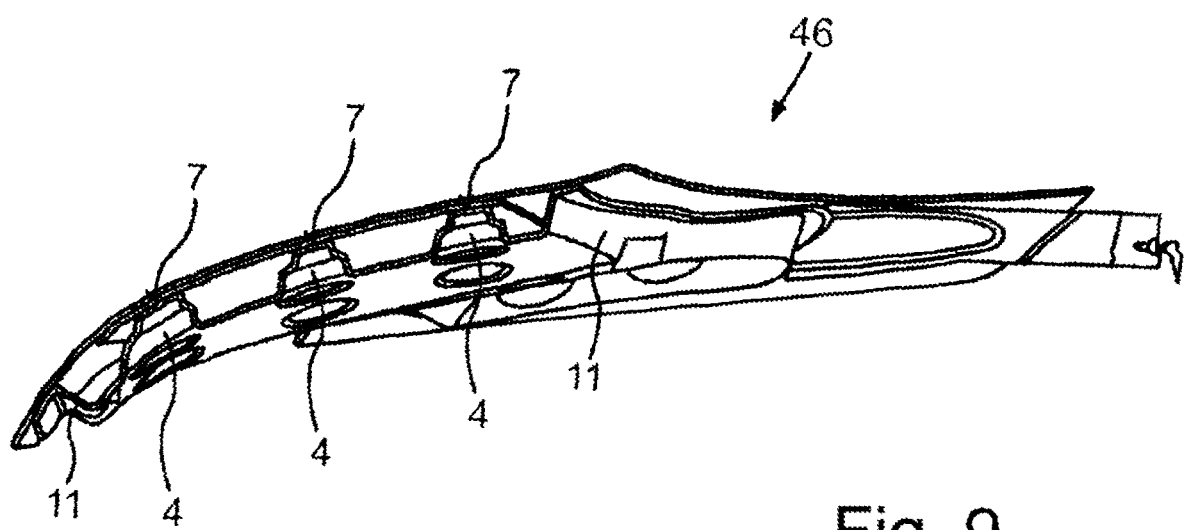

FIG. 9 a sectional view along a longitudinal section plane perpendicularly intersecting the flap.

In the figures, the same or similarly-functioning elements are provided with the same reference signs.

FIG. 1 shows a perspective view of a crash structure 1 for a motor vehicle 2 (first shown in FIG. 6). A plurality of deformation units 4 extends from an at least substantially cuboid designed carrier body 3. In particular, the respective or individual deformation units 4 protrude from a carrier surface 5 of the carrier body 3. In the present example, the crash structure 1 has 38 deformation units 4, which are arranged in two parallel rows of 19 deformation units 4 each.

The respective deformation unit 4 has at least two, in the present case three, deformation elements 6 arranged one above the other and connected to one another, by which a respective impact surface 7 is spaced apart from the carrier surface 5.

When making a comparison between deformation units 4a that are arranged at least substantially centrally on the carrier body 3 and the deformation units 4b arranged outside the centre of the carrier body 3, it can be seen that the individual deformation elements 6 of the central deformation units 4 can be arranged coaxially one above the other. In the case of the deformation units 4b further away, it can be provided that the respective deformation elements 6 are not arranged coaxially to one another.

In order to enable a particularly advantageous incorporation of the crash structure 1 in the motor vehicle 2, the carrier body can have a radius 8 such that the carrier body can be viewed as part of an outer surface of a circular cylinder determined by the radius 8, which can be straight or perpendicular.

FIG. 2 shows the crash structure in a perspective and sectional view, wherein a section plane A-A is drawn in FIG. 1. It can be seen that the deformation units 4, in particular the deformation units 4a, have the deformation elements 6 which are each arranged coaxially to one another along a longitudinal centre axis 9 of the deformation unit 4, 4a. Further, it can dearly be seen from FIG. 2 that the deformation units 4, 4a, 4b are each formed in one piece with the carrier body 3, whereby the crash structure 1 is formed. Here, the deformation units 4 are each formed as a concave material extension of the carrier body 3 when viewed from an inner surface 10 of the carrier body 3 opposite the carrier surface 5, wherein the deformation units 4 are each formed as a convex material extension of the carrier body 3 when viewed from the carrier surface 5.

The crash structure 1 can have at least one lateral tab 11, in the present example two lateral tabs 11. Looking again at FIG. 1, it can be seen that the respective lateral tab 11 can comprise a fastening device 12 which can have a plurality of through-openings 13, which completely penetrate the respective lateral tab 11. By way of example, the through-openings 13 can each be a slot through which a fastening element, for example a screw, a rivet etc., can be arranged, so that the crash structure 1 can be particularly easily fastened in a known manner to a carrier structure and/or another component of the motor vehicle 2.

For the invention, it is essential that the respective deformation element 6 has two mutually opposite longitudinal section surfaces 15 and 16 in a longitudinal section 14, each of which follows a non-straight curve 17, 18 (first shown in FIG. 3).

FIG. 3 shows one of the deformation units 4 in a longitudinal sectional view along the sectional plane A-A (see FIG. 1). It can be seen particularly clearly that an outer peripheral surface 19 of the respective deformation element 6 in the sectional view of FIG. 3 follows a respective one of the two curves 17, 18 along the longitudinal centre axis 9. In this case, the curves 17, 18 are each formed differently from a straight line. In particular, a mathematical function describing the respective curves 17, 18 can be given according to a formula $$z = x^2 - y^2 \quad \quad \text{F1}$$

or $$x = y \cdot z \quad \quad \text{F2.}$$

It goes without saying that the formulas F1, F2 can be parameterised, in that the variables are mathematically linked to a parameter or a plurality of parameters in one or more positions. Thus, the respective curves 17, 18 can be designed, for example, as a hyperbola branch.

The curve 17 and the curve 18 can be respective branches of a common hyperbola, wherein the two branches are shifted and/or rotated separately from one another in such a way that when an inner peripheral surface 20 of the corresponding deformation element 6 viewed, it is concave along the inner peripheral direction thereof. Further, the two curves 17, 18 can each belong to their own hyperbola, wherein for better understanding a hyperbola 21 belonging to the curve 17 and a hyperbola 22 belonging to the curve 18 are partially shown in FIG. 3.

FIG. 3 also shows that a deformation element 6a directly adjoining the carrier surface 5 is connected in this connection region 23 to the carrier body 3. Further, the deformation element 6b adjoining the deformation element 6a has a connection region 24, via which the deformation element 6b is connected to the deformation element 6a. Analogously, the deformation element 6c adjoining the deformation element 6b has a connection region 25, via which the deformation element 6c is connected to the deformation element 6b.

In the present example, a connection element 26 is arranged in each case between the deformation element 6a and the deformation element 6b, as well as between the deformation element 6b and the deformation element 6c, which connection element is arranged in the respective connection region 24, 25 and/or at least partially forms the respective connection region 24, 25. In other words, the deformation element 6a and the deformation element 6b, as well as the deformation element 6b and the deformation element 6c, are connected to one another via a respective connection element 26. In particular, it is provided that the deformation elements 6a, 6b, 6c, the connection elements 26 and the impact surface 7 are formed together with the carrier body 3, for example by deep drawing, so that the respective deformation unit 4 for the crash structure 1 is formed.

In the longitudinal section of the deformation unit 4 shown in FIG. 3, and consequently of which the respective connection element 26 can be identified, it can be seen that an outer contour 27 of the respective connection element 26 is designed at least substantially as a truncated cone. Here, an outer surface 28 of the truncated cone and a parallel 29 to the carrier surface 5 or to the carrier body 5 form a predetermined angle 30 with one another. The angle 30 is particularly preferably 3 degrees, although the depiction of the deformation unit 4 in FIG. 3 is not the true angle for purposes of better illustration. In the installed state of the crash structure 1, the longitudinal centre axis 9 of the deformation unit 4 and a vehicle longitudinal direction 31 (see FIG. 6) can coincide with one another, so that the parallel 29 can be a vertical.

FIG. 4 shows a partial view of the crash structure 1 cut along a sectional plane B-B shown in FIG. 3 looking into the interior of the deformation unit 4, wherein the illustrated deformation unit 4 extends in the plane of the drawing. The cross-section shown there of the deformation unit 4 follows an oval 32, which in the present example is designed as a circle. It thus emerges, in particular when looking at FIG. 4 with FIG. 3, that the inner peripheral surface 20 of the respective deformation element 6 is doubly curved. This applies in an analogous manner to the outer peripheral surface 19 of the respective deformation element 6. In the present example, the respective deformation elements 6 and the connection elements 26 each have a circular cross-sectional surface 33, which is shown as a representative of the deformation elements 6 and of the connection elements 26 on the deformation element 6a.

Referring again to FIG. 3 it is clearly visible that the respective deformation element 6 has a proximal region 34 and a distal region 35. The positional information (proximal/distal) of the two regions 34, 35 are each relative to the carrier body 3 or to the carrier surface 5. This means that a respective proximal region 34 is arranged closer to the carrier body 3 or to the carrier surface 5 than the corresponding distal region 35 of the same deformation element 6. Looking at FIG. 3 together with FIG. 4, it can be seen particularly clearly that the respective deformation elements 6 in the respective proximal region 34 are designed larger than in the respective distal region 35. More precisely, the respective deformation element 6 encloses a larger surface in its proximal region 34 arranged close to the carrier surface 3 than in the respective distal region 35, arranged remote from the carrier surface 5. In the present example, the respective surface enclosed by the respective deformation element 6 designed as a circular disc. As a result, an outer contour can be given for the respective deformation element 6, which can be referred to as egg-shaped. This means that the respective deformation element tapers along the longitudinal centre axis 9 in the direction away from the carrier surface 5, wherein the enclosed surface or circular disc between the proximal region 34 and the distal region 35 of the deformation element 6 in question can be larger than the regions 34, 35. In other words, the respective deformation element 6 can first widen exactly once along the longitudinal centre axis 9 in the direction away from the carrier surface 5, in order to taper further away from the carrier surface 5 to the circular disc enclosed in the distal region 35.

In the present case, one of the connection elements 26 or the impact surface 7 is arranged directly in the respective distal region 35 of the respective deformation element 6. With the deformation elements 6a, 6b, the corresponding connection region 24, 25, which can be formed by the respective connection element 26, is arranged in their respective distal region 35. It can also be clearly seen that for a pair of deformation elements 6, for example the deformation elements 6a, 6b, the deformation element 6 further away from the carrier surface 5, for example the deformation element 6b, has a proximal region 34 which is smaller than a distal region 35 of the deformation element 6 arranged closer to the carrier surface 5, for example the deformation element 6a.

When considering a pair or a group of deformation elements 6, for example the deformation elements 6a, 6b, 6c, the impact surface 7 is arranged in the distal region 35 of the deformation element 6 spaced apart furthest from the carrier surface 5, in particular formed in one piece with the corresponding deformation element 6, 6c. The impact surface 7 can be arranged substantially parallel to the carrier body 3 or to the carrier surface 5. It is however also conceivable, that a respective impact surface 7 of the corresponding deformation unit 4 can be arranged at an angle to the carrier body 3 or to the carrier surface 5. This is illustrated in FIG. 5, which shows a perspective view of the crash structure 1 cut along the sectional plane A-A shown in FIG. 1. Such a geometrical design of the crash structure 1 takes into account a concept of a particularly efficient pedestrian protection in a particular way, since in the event of an impact of the motor vehicle 2 with another party involved in the accident the crash structure 1 is adapted to a contact surface of the other party involved in the accident, in particular to spatial dimensions of the other party involved in the accident, whereby in a particularly advantageous manner, the other party involved in the accident is caught by the crash structure 1, whereby the severity of injury in the accident for the other party involved in the accident is particularly low.

In comparison to the previously described embodiments of the crash structure 1, the crash structure 1 depicted in FIG. 5 shows only one deformation element 6 for a respective deformation unit 4, but the specific positional design of the respective impact surface 7 can be easily transferred to deformation units 4 that have more than one deformation element 6.

It can also be seen in FIG. 5 that the respective impact surface 7 can have a rounding, in particular on the outside thereof facing away from the carrier surface 5, in order to be able to even better apply the impact surface 7 on the outer contour of the other party involved in the accident.

FIG. 6 shows a schematic illustration of the motor vehicle 2, which is fitted with a crash structure 1 or plurality of crash structures 1. It is in particular an advantage if regions of the motor vehicle 2, in particular along the outer contour thereof, are equipped with a crash structure 1 or a plurality of crash structures 1, which will be hit with a particularly high probability by the other party involved in the accident, in particular by a head, torso and/or at least one extremity of the other party involved in the accident. Correspondingly, it can be provided that a front bumper 36, a rear bumper 37 and/or side bumper 38 is/are formed at least partially by a respective crash structure 1 or plurality of crash structures 1. In particular in an accident of the motor vehicle 2 with a pedestrian, it can be particularly advantageous if a flap 39, in particular an engine compartment lid, a boot lid etc., is equipped with a crash structure 1 or a plurality of crash structures 1. Should the pedestrian or a cyclist hitting the side of the motor vehicle 2 be lifted on to a roof 40 of the motor vehicle 2 due to the accident and be hit there, the severity of an injury resulting from this can be kept particularly low by means of a roof 40 equipped with a crash structure 1 or a plurality of crash structures 1. In particular, the individual deformation elements 6 or the individual deformation units 4, 4a can be arranged such that the respective impact surface 7 faces the potential other party involved in the accident. Alternatively or in addition, deformation elements 6 or deformation units 4, 4a are provided, which are arranged such that the corresponding impact surface 7 faces away from the potential other party involved in the accident. For example, a respective impact surface 7 can be supported on the support structure of the motor vehicle 2. In particular, the deformation elements 6 of the crash structure 1 can protrude in a common direction from the common carrier body 3.

FIG. 7 shows a schematic illustration of a sequence of a method for manufacturing the crash structure 1. Here, the carrier body 3 is provided in a first method step S1, which in the undeformed state has at least one flat portion 41 or is designed at least substantially or completely flat, in particular cuboid. Here, the carrier body 3 can be provided as sheet goods, as is also illustrated in FIG. 7. It is however also conceivable that the carrier body 3 is provided as rolled goods. Before a further method step, it can be provided that the not yet deformed carrier body 3 is trimmed, for example, with respect to its longitudinal and/or transverse dimensions.

In a further, for example second, method step S2, the at least substantially completely cuboid carrier body 3 or the flat or completely cuboid portion 41 of the carrier body 3 is provided or supplied to a forming tool 42 which comprises a heating device 43. Then, at least the flat portion 41 of the carrier body 3 is heated by means of the heating device 43. In particular, the flat portion 41 of the carrier body 3 is heated by means of the heating device 43 to a deformation temperature, at which the carrier body 3 can be particularly efficiently deformed. It is therefore particularly advantageous if the carrier body 3 is manufactured at least substantially from thermoplastic, which can be deformed at the thermoplastic deformation temperature.

In a further step S3, the heated carrier body 3 is brought into overlap with a negative mould 44 of the forming tool 42. Here, an inner peripheral contour 45 of the negative mould 44 follows at least substantially an outer contour of the at least one deformation unit 4 to be moulded on the carrier body 3. In particular, the negative mould 44 can be designed to form a plurality of deformation units 4 simultaneously. The heated carrier body 3 is particularly advantageously brought into interaction with the negative mould 44, in such a way that an inflow and/or outflow of a gas, in particular air, via a contact surface between the carrier body 3 and the negative mould 44 is at least substantially excluded.

A negative pressure is then generated between the flat portion 41 of the heated carrier body 3 and the negative mould 44 of the forming tool 42 by means of an undepicted vacuum device of the forming tool 42. As a result, portions of the heated and consequently thermoplastically deformable carrier body 3 directly adjacent to the inner peripheral contour 45 are sucked into the negative mould 44. Accordingly, in this method step, the crash structure 1 is manufactured in that a material of the carrier body 3, in particular thermoplastic, rests on the inner peripheral contour 45 of the negative mould 44. Hence the thus deformed carder body 3 has the flat portion 41, which is interrupted by the vacuum-formed deformation units 4. Accordingly, the carrier body 3 and the respective deformation units 4 are formed in one piece. In this way, a particularly simple method for manufacturing the crash structure 1 is provided, wherein the crash structure 1 can be manufactured in a particularly material efficient manner, since machining of the carrier body 3 is completely eliminated.

It can also be part of the manufacturing method that the lateral tabs 11 are connected to the carrier body 3 or, similarly to the respective deformation units 4, are formed in one piece together with the carrier body 3.

Overall the invention discloses how the impact energy between the motor vehicle 2 involved in an accident and the other party involved in the accident is converted in a particularly advantageous manner into a deformation energy by means of the crash structure 1 which is particularly easy to manufacture. Particular attention is paid here to the protection of pedestrians, who are usually involved in accidents with motor vehicles, wherein the motor vehicle has a particularly low speed, in particular less than 50 kilometres per hour.

The crash structure 1 manufactured from a thermoplastic, in particular polypropylene, has a particularly advantageous resistance to a hit with a high flexural strength, since polypropylene has a corresponding crystalline lattice structure.

Due to the at least partially hyperbolically or parabolically formed cross-section of the respective deformation units 4, which are each at least partially defined by the formulas F1 and/or F2, a double curvature results for each individual one of the deformation elements 6 of the respective deformation units 4. As a result, the crash structure 1 can be produced in a particularly mass-efficient manner, wherein this high efficiency is effective during an impact of another party involved in the accident on the crash structure 1.

By means of the manufacturing method provided, the crash structure 1 is particularly simple and/or inexpensive to manufacture, in particular to manufacture cost effectively, using a vacuum thermoforming process.

A further core concept of the present invention is a stepped hyperbolic and parabolic cross-section, which in the present example is designed in three steps. This guarantees that the respective deformation unit 4 of the crash structure 1 is designed to be multiple, in particular triple, collapsible, wherein by way of example, only a first step collapses due to the impact energy, if the impact energy is particularly low. If the impact energy exceeds a certain value, then alternatively or in addition the first step, the second and/or the third step of the corresponding deformation unit 4 can be collapsed by means of the impact energy.

FIG. 8 shows a perspective illustration of a flap 46, for example an engine compartment lid, of the motor vehicle 2. The crash structure 1, which is bonded to an inner side 47 of the engine compartment lid 46 via its lateral tabs 11, can clearly be seen. It can also be seen that the deformation units 4, 4a (only some of which are provided with the corresponding reference sign in FIG. 8 for reasons of clarity) starting from the carrier body 3 extend in the direction towards the interior 47 of the flap 46. In other words, the deformation units 4, 4a are arranged between the carrier body 3 and the inner side 47.

FIG. 9 shows a sectional view along a longitudinal sectional plane intersecting the flap 46 perpendicularly. It can be clearly seen in this sectional view that the individual deformation units 4, 4a are supported on the inner side 47 of the flap 46 via the respective impact surface 7.

LIST OF REFERENCE SIGNS 1 crash structure 28 outer surface
2 motor vehicle 29 parallel
3 carrier body 30 angle
4 deformation unit 31 vehicle longitudinal direction
4a deformation unit 32 oval
4b deformation unit 33 cross-sectional surface
5 carrier surface 34 proximal region
6 deformation element 35 distal region
6a deformation element 36 bumper
6b deformation element 37 bumper
6c deformation element 38 bumper
7 impact surface 39 flap
8 radius 40 roof
9 longitudinal centre axis 41 portion
10 inner surface 42 forming tool
11 tab 43 heating device
12 fastening device 44 negative mould
13 through-openings 45 inner peripheral contour
14 longitudinal section 46 flap
15 longitudinal section surface 47 inner side
16 longitudinal section surface
17 curve F1 mathematical formula
18 curve F2 mathematical formula
19 outer peripheral surface
20 inner peripheral surface S1 method step
21 hyperbola S2 method step
22 hyperbola S3 method step
23 connection region
24 connection region
25 connection region
26 connection element
27 outer contour

The invention claimed is:

1. Crash structure for a motor vehicle, comprising a carrier body, from a carrier surface of which at least one deformation unit formed integrally with the carrier body protrudes, which deformation unit is formed by at least two deformation elements arranged one above the other and connected to each other and by an impact surface, wherein a longitudinal section of each deformation element has two longitudinal section surfaces lying opposite each other and following respective non-straight curves, wherein an impact surface is spaced apart from the carrier surface by the deformation elements, and wherein each of the respective non-straight curves is a branch of a hyperbola.

2. Crash structure according to claim 1, wherein a cross-section of the respective deformation elements has a cross-sectional surface following an oval.

3. Crash structure according to claim 1, wherein the two deformation elements in a respective proximal region arranged close to the carrier surface enclose a larger surface in a respective inner peripheral direction than in a respective distal region, arranged remote from the carrier surface.

4. Crash structure according to claim 1, wherein a connection element (26) arranged between the two deformation elements, via which the two deformation elements are connected to one another.

5. Crash structure according to claim 4, wherein an outer contour of the connection element is designed at least substantially as a truncated cone, the outer surface of which forms a predetermined angle with a parallel to the carrier surface.

6. Crash structure according to claim 1, wherein the impact surface and the carrier surface are arranged at an angle to each other.

7. Crash structure according to claim 1, wherein the impact surface and the carrier surface are arranged parallel to each other.

8. Crash structure according to claim 1, wherein at least one further deformation unit, wherein the first and the further deformation unit are arranged one above the other and/or next to one another along the carrier surface.

9. Crash structure according to claim 1, wherein the carrier body has at least one lateral tab, via which the crash structure can be incorporated in the motor vehicle.

10. Motor vehicle comprising a crash structure designed according to claim 1, by means of which an impact energy can be converted, at least in large part, into a deformation energy by deforming at least one of the two deformation elements.

11. Motor vehicle according to claim 10, wherein at least one bumper which is at least partially formed by the crash structure.

12. Method for manufacturing a crash structure designed according to claim 1, comprising the steps of:
providing the carrier body having a flat portion;
heating at least the flat portion of the carrier body by means of a heating device of a forming tool; and
generating a negative pressure between the flat portion of the carrier body and a negative mould of the forming tool of the at least one deformation unit by means of a vacuum device of the forming tool, whereby a material of the flat portion is applied on an inner contour of the negative mould and as a result the at least one deformation unit is formed on the carrier body.

* * * * *